United States Patent [19]

Catalano et al.

[11] 3,923,231

[45] Dec. 2, 1975

[54] DIFFUSION BONDING OF GOLD TO GOLD

[75] Inventors: Edward Catalano, Pleasanton; Donald L. Ornellas, Livermore, both of Calif.

[73] Assignee: The United States of America as represented by the Energy Research and Development Administration, Washington, D.C.

[22] Filed: Apr. 11, 1975

[21] Appl. No.: 567,230

[52] U.S. Cl. .................................. 228/194; 228/193
[51] Int. Cl.² .......................................... B23K 19/00
[58] Field of Search ........... 228/116, 115, 193, 194, 228/242

[56] References Cited

UNITED STATES PATENTS

| | | | |
|---|---|---|---|
| 2,438,967 | 4/1948 | Ellsworth | 228/193 X |
| 3,579,808 | 5/1971 | Hagan et al. | 228/193 |

OTHER PUBLICATIONS

"Diffusion Bonding–Methods and Applications Part II–Techniques", Gerald V. Alm, Adhesives Age, Aug., 1970, Vol. 13, No. 8, pp. 33–37.

"The Solid Phase Welding of Metals", R. F. Tylecote, New York, St. Martin's Press (1968), pp. 189–192, 301–318.

"Introduction to Diffusion Bonding", P. M. Bartle, Metal Construction and British Welding Journal, May, 1969, pp. 241–244.

*Primary Examiner*—James L. Jones, Jr.
*Assistant Examiner*—Margaret Joyce
*Attorney, Agent, or Firm*—Dean E. Carlson; Frederick A. Robertson; John H. G. Wallace

[57] ABSTRACT

Low temperature diffusion bonds of gold to gold in which the bond tensile strength exceeds the yield point of gold, made by wetting the bonding surfaces with mercury and clamping the wetted surfaces together with moderate pressure, at a temperature of 100°C for a period of 22–30 days.

5 Claims, No Drawings

DIFFUSION BONDING OF GOLD TO GOLD

BACKGROUND OF THE INVENTION

The invention described herein was made in the course of, or under, Energy Research and Development Administration Contract No. W-7405-ENG-48 with University of California.

In the field of metallurgy there has been need of a process for the solid state bonding of certain materials, which avoids both macroscopic deformation of the materials and excessively high bonding temperatures. More particularly, a need has arisen for the encapsulation of heat sensitive materials in a thin gold shell, wherein the maximum process temperature must not exceed 100°C and the encapsulating gold shell must have maximum strength and must retain its shape. The process of solid state diffusion bonding, thought to be one promising solution to the problem, is a joining in the solid state with only slight macroscopic deformation, by diffusion within a fixed time, under pressure and with the application of heat. It was found that little was known about the diffusion bonding of gold to gold and specifically, it was not known if such a process could produce a bond of sufficient strength at the required low temperature of not over 100°C.

SUMMARY OF THE INVENTION

It is an object of the present invention to develop a process for the diffusion bonding of gold to gold.

It is a further object of the invention to develop a diffusion bonding process for bonding gold to gold in which: 1) the bonding temperature does not exceed 100°C, 2) the bond strength is equal to or greater than the strength of the material bonded and 3) there is little or no macroscopic deformation of the material during the bonding process.

The present invention accomplishes the above objects of the invention by providing a gold to gold diffusion bonding process in which an interlayer material of mercury is pressed between faying surfaces of fine gold at a sufficient pressure to bring the surfaces and interlayer material into good contact, without deforming the gold, the joint being maintained at a temperature of 100°C for 22–30 days while under bonding pressure.

DETAILED DESCRIPTION OF THE INVENTION

Test bonds were made by taking strips of cold rolled fine gold (99.93 percent Au) 1 mm thick by 7.9 mm wide by 120 mm long and overlapping them about 7.9 mm to obtain a contact area of about 62 mm$^2$. A minimal amount of interlayer material was placed between the overlapped gold surfaces, pieces of steel 2.4 mm thick were placed on both sides of the overlapped assemblies to serve as clamping blocks and small C clamps were used to hold the assemblies together under sufficient pressure to bring the gold and interlayer into good contact without deforming the gold. The clamped assemblies were then placed in an oven at 100°C for period ranging from 22–30 days. At the end of the period the bonds were tested for tensile strength on a mechanical tester.

Three different interlayer materials were tried in the test bonds: mercury, indium and gallium. Mercury was applied to the test strips in liquid form by wetting the surfaces to be bonded and tapping sharply to remove any excess. In this manner 25–50 mg of mercury were applied to the bonding surfaces (approximately 62 mm$^2$) of each assembly. Indium was applied to the bonding surfaces as foil in two different thicknesses: 0.127 mm (about 60 mg) and 0.025 to 0.051 mm (about 12 to 23 mg), and also by melting about 8 mg onto the gold. Gallium was applied by melting about 10 mg onto the gold.

The 1 mm thick gold sheet used had about a $2\times10^{-7}$ m surface finish in its original condition. Three different sheet surface finsihes were used in the test bonds: 1) the original $2\times10^{-7}$ m finish, 2) surfaces lightly scratched with a wire brush and 3) surfaces lapped with a $3\times10^{-7}$ m particle size $Al_2O_3$ abrasive, using as a vehicle water with a wetting agent, and held by hand pressure against a rotating table. In all cases the gold surfaces were washed with acetone and dried before applying the interlayer.

Results and a summary of expirmental conditions are given in Table 1, below.

TABLE 1

DIFFUSION BONDING OF GOLD TO GOLD

| Test | Temp. (°C) | Time (Days) | Interlayer metals and breaking force (kg) Hg | In | Ga | Comments |
|---|---|---|---|---|---|---|
| 0 | Amb | 2 | a | — | — | Au surface used as is |
| 1 | 100 | 26 | 18 | b | c | Au surface roughened with wire brush |
| 2 | 100 | 22 | 48 | 19[d] | c | Au surface roughened with wire brush |
| 3 | 100 | 29 | 78 | 39[3] | — | Au surface used as is with steel backing plates |
| 4 | 100 | 30 | 77 | 20[e] | — | Polished Au surface with steel backing plates |

[a]No bond detected.
[b]Broke within indium plane when twisted with heavy hand pressure. Indium applied 0.127 mm thick in this test.
[c]Broke with light hand pressure.
[d]Indium was melted onto Au
[e]Indium was applied as 0.025— to 0.051 —mm foil (0.012–0.023 g) without melting.

The best bonds were obtained using mercury interlayers on the original and lapped gold surfaces. The tensile strength of these bonds exceeded the yield point of gold. This was evidenced by a reduction in cross section of the test pieces after mechanical testing. Electron microprobe analysis of a bond with a mercury interlayer showed that the mercury had penetrated no deeper than $2.5 \times 10^{-5}$ m. As shown in the table, indium interlayers produced bonds, but of much lower tensile strength than those using mercury. Gallium produced little or no bonding.

What we claim is

1. A process for diffusion bonding gold to gold comprising:

1. placing a mercury interlayer between two similarly surfaced gold pieces which are to be bonded together,
2. pressing together the two gold surfaces with the mercury interlayer between them,
3. while pressing the gold-mercury-gold assembly together, heating the assemly to a temperature of about 100°C, and 4. maintaining said assembly under pressure at said temperature for a period of time exceeding two days.

2. The process of claim 1 wherein a minimal amount of mercury is applied in liquid form by wetting with mercury those surfaces to be bonded and removing any mercury in excess of that necessary to wet such surfaces.

3. The process of claim 1 wherein the gold-mercury-gold assembly is pressed together with sufficient pressure to bring the gold and mercury into good contact, but with less pressure than that needed to deform the gold.

4. The process of claim 1 wherein the gold surfaces which are to be bonded together have a surface finish equal to or smoother than $3 \times 10^{-6}$ m.

5. The process of claim 1 where said assembly is maintained under pressure at said temperature for at least 22 days.

* * * * *